US010958444B2

(12) United States Patent
Gill et al.

(10) Patent No.: US 10,958,444 B2
(45) Date of Patent: Mar. 23, 2021

(54) UNIQUELY IDENTIFYING AND SECURELY COMMUNICATING WITH AN APPLIANCE IN AN UNCONTROLLED NETWORK

(71) Applicant: Akamai Technologies, Inc., Cambridge, MA (US)

(72) Inventors: Rupinder Singh Gill, Robina (AU); Shravan Kumar Mettu, Redwood City, CA (US); Seetharama Sarma Ayyadevara, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 74 days.

(21) Appl. No.: 15/360,337

(22) Filed: Nov. 23, 2016

(65) Prior Publication Data

US 2017/0170973 A1 Jun. 15, 2017

Related U.S. Application Data

(60) Provisional application No. 62/260,035, filed on Nov. 25, 2015.

(51) Int. Cl.
*H04L 29/06* (2006.01)
*H04L 9/32* (2006.01)
(Continued)

(52) U.S. Cl.
CPC ............ *H04L 9/3263* (2013.01); *H04L 9/006* (2013.01); *H04L 9/007* (2013.01); *H04L 9/14* (2013.01);
(Continued)

(58) Field of Classification Search
CPC ......... H04L 9/3263; H04L 9/006; H04L 9/30; H04L 9/3247; H04L 63/0272;
(Continued)

(56) References Cited

U.S. PATENT DOCUMENTS

2011/0063093 A1* 3/2011 Fung .................. G06Q 10/06
340/10.52
2012/0089847 A1* 4/2012 Tu ...................... G06F 21/42
713/182
(Continued)

FOREIGN PATENT DOCUMENTS

JP 2016224604 A * 12/2016 ........... H04L 9/3268
WO 2015080731 A1 6/2015

OTHER PUBLICATIONS

PCT/US2016/063561 International Search Report and Written Opinion dated Mar. 2, 2017, 13 pages.
(Continued)

*Primary Examiner* — Harunur Rashid
(74) *Attorney, Agent, or Firm* — David H. Judson

(57) ABSTRACT

A service consumer that utilizes a cloud-based access service provided by a service provider has associated therewith a network that is not capable of being controlled by the service provider. An enterprise connector is supported in this uncontrolled network, preferably as an appliance-based solution. According to this disclosure, the enterprise configures an appliance and then deploys it in the uncontrolled network. To this end, an appliance is required to proceed through a multi-stage approval protocol before it is accepted as a "connector" and is thus enabled for secure communication with the service provider. The multiple stages include a "first contact" (back to the service) stage, an undergoing approval stage, a re-generating identity material stage, and a final approved and configured stage. Unless the appliance passes through these stages, the appliance is not permitted to interact with the service as a connector. As an additional aspect, the service provides various protections for addressing scenarios wherein entities masquerade as approved appliances.

18 Claims, 5 Drawing Sheets

(51) Int. Cl.
  *H04L 9/00* (2006.01)
  *H04L 9/14* (2006.01)
  *H04L 9/30* (2006.01)

(52) U.S. Cl.
  CPC .............. *H04L 9/30* (2013.01); *H04L 9/3247* (2013.01); *H04L 63/0272* (2013.01); *H04L 63/06* (2013.01); *H04L 63/0815* (2013.01); *H04L 63/0823* (2013.01); *H04L 63/101* (2013.01); *H04L 63/126* (2013.01); *H04L 2463/082* (2013.01)

(58) Field of Classification Search
  CPC ....... H04L 63/0815; H04L 9/14; H04L 63/06; H04L 2463/082
  See application file for complete search history.

(56) References Cited

U.S. PATENT DOCUMENTS

| | | | | |
|---|---|---|---|---|
| 2015/0222611 | A1* | 8/2015 | Moore | H04L 63/062 713/171 |
| 2015/0229629 | A1* | 8/2015 | Ishaya | H04L 63/08 726/4 |
| 2016/0323114 | A1* | 11/2016 | Sulpizio, Jr. | H04L 9/3268 |
| 2016/0352527 | A1* | 12/2016 | Satoh | H04L 9/006 |

OTHER PUBLICATIONS

Chinese Application No. 201680069105.X, First Office Action dated Jun. 30, 2020, 9 pages includes English translation.
EPO Application 16869258.0, extended European search report dated Apr. 17, 2019, 7 pages.

* cited by examiner

US 10,958,444 B2

UNIQUELY IDENTIFYING AND SECURELY COMMUNICATING WITH AN APPLIANCE IN AN UNCONTROLLED NETWORK

BACKGROUND

Technical Field

This application relates generally to access control in an enterprise networking environment.

Brief Description of the Related Art

Delivering applications to external partners, contractors, and other third parties, is a very complex process. For Information Technology (IT) and security teams, it can take weeks or months to secure an internal application and make it available to users on the Internet. To let external users in a protected network, typically the enterprise has to punch a hole through its network perimeter, and then configure and run one or more security appliances to keep undesired information and data from coming through. At a minimum, setting up such a solution is a complex error-prone task that often requires coordination across multiple IT and security teams. Even then, the risk of attack from Internet attacks, malware on user devices, and stolen credentials, pose constant threats.

To address this problem, it is known to provide secure access as-a-service that eliminates the need for the enterprise to punch holes in its network perimeter. Instead, permitted users access enterprise applications through a service provider cloud that stops and secures the user's access far outside the network perimeter. One such solution is Soha Cloud, an offering of Akamai Technologies, Inc. With this type of approach, there is no direct path into the enterprise application; instead, the service provider creates a secure, mutually-authenticated, TLS-based connection from within the enterprise network or cloud, and then uses that connection to bring the enterprise application to the external user. The cloud-based solution stops all user connections in the cloud, terminating them on secure proxies, while applying strong authentication and security controls. The approach is also extensible so that enterprises can include their own security controls for increased protection of highly sensitive applications. A solution of this type is described in U.S. Pat. No. 9,491,145, the disclosure of which is incorporated by reference.

A service of this type also might require presence of one or more appliances in networks that are not controlled by the service provider to jointly deliver one or more features and functions to traffic traversing the service network and also the uncontrolled network. Such appliances need to be able to communicate securely back home to the service, and the service needs to be able to uniquely identify and authenticate such appliances connecting to the service from untrusted networks.

The technique of this disclosure addresses this requirement.

BRIEF SUMMARY

A cloud-based access service provided by a service provider has associated therewith an uncontrolled network. An uncontrolled network is one in which the service provider cannot secure or have policies applied, although typically a service provider customer has control over that network. According to this disclosure, it is desired to support an enterprise connector (or a similar type of device) in this uncontrolled network, preferably as an appliance-based solution. An "appliance" in this context typically is a software-based virtual machine (VM). According to this disclosure, a representative of the enterprise (or some entity that owns or controls the uncontrolled network) configures one or more new appliances, and such appliances are then deployed in the uncontrolled network. To this end, an appliance is required to proceed through a multi-stage approval protocol before it is accepted as a "connector" and is thus enabled for secure communication with the service provider. The multiple stages include a "first contact" (back to the service) stage, an undergoing approval stage, a re-generating identity material stage, and a final approved and configured stage. Unless the appliance passes through these stages, the appliance is not permitted to interact with the service as a connector. As an additional aspect, the service provides various protections for addressing scenarios wherein entities masquerade as approved appliances.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION

Figure 1:
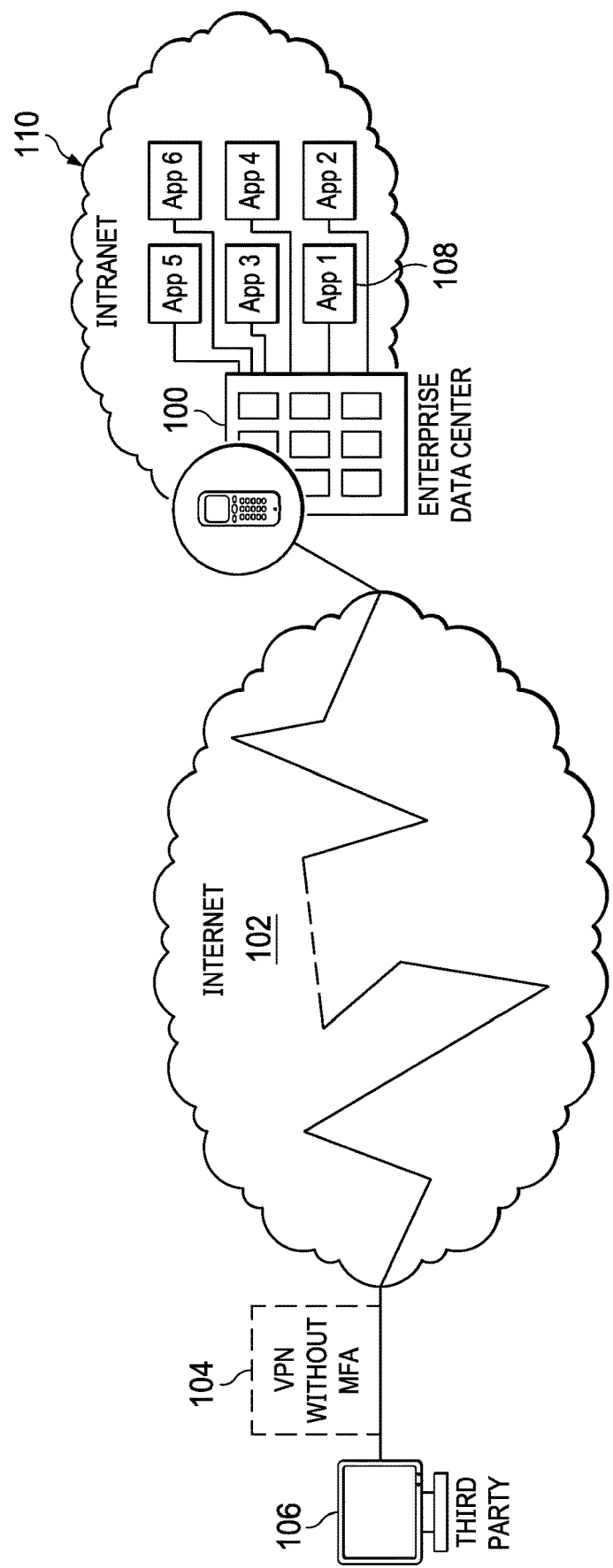
FIG. 1 is a representative enterprise network operating environment in which the techniques of this disclosure may be implemented.

FIG. 1 depicts a representative operating environment in which the techniques of this disclosure may be practiced. In this environment an enterprise data center 100 is accessible via the publicly-routed Internet 102, typically via a Virtual Private Network (VPN) 104 that does not provide for multi-factor authentication (MFA). In this example scenario, a third party user 106 desires to access one or more enterprise applications 108 that are located within the enterprise intranet 110. Existing virtual private network (VPN)-based solutions such as depicted can significantly increase security risk by allowing third party users 106 unfettered access to the entire enterprise network 110 and all applications 108. Indeed, lateral movement on the network (by an otherwise authorized third party) can increase the likelihood of a data breach. By way of background, enterprise application access provides employees with secure access to enterprise applications deployed behind the firewall. In addition, applications are being modernized, are moving to the cloud, and are often accessed on employee and third party (contractor, partner, supplier, and franchisee) endpoints that are not controlled or managed by the enterprise. Due to this environment, many current remote access solutions are often difficult to provision, maintain and manage, and they typically lack simple single sign-on (SSO) and multi-factor authentication (MFA) to improve security and user experiences.

Figure 2:
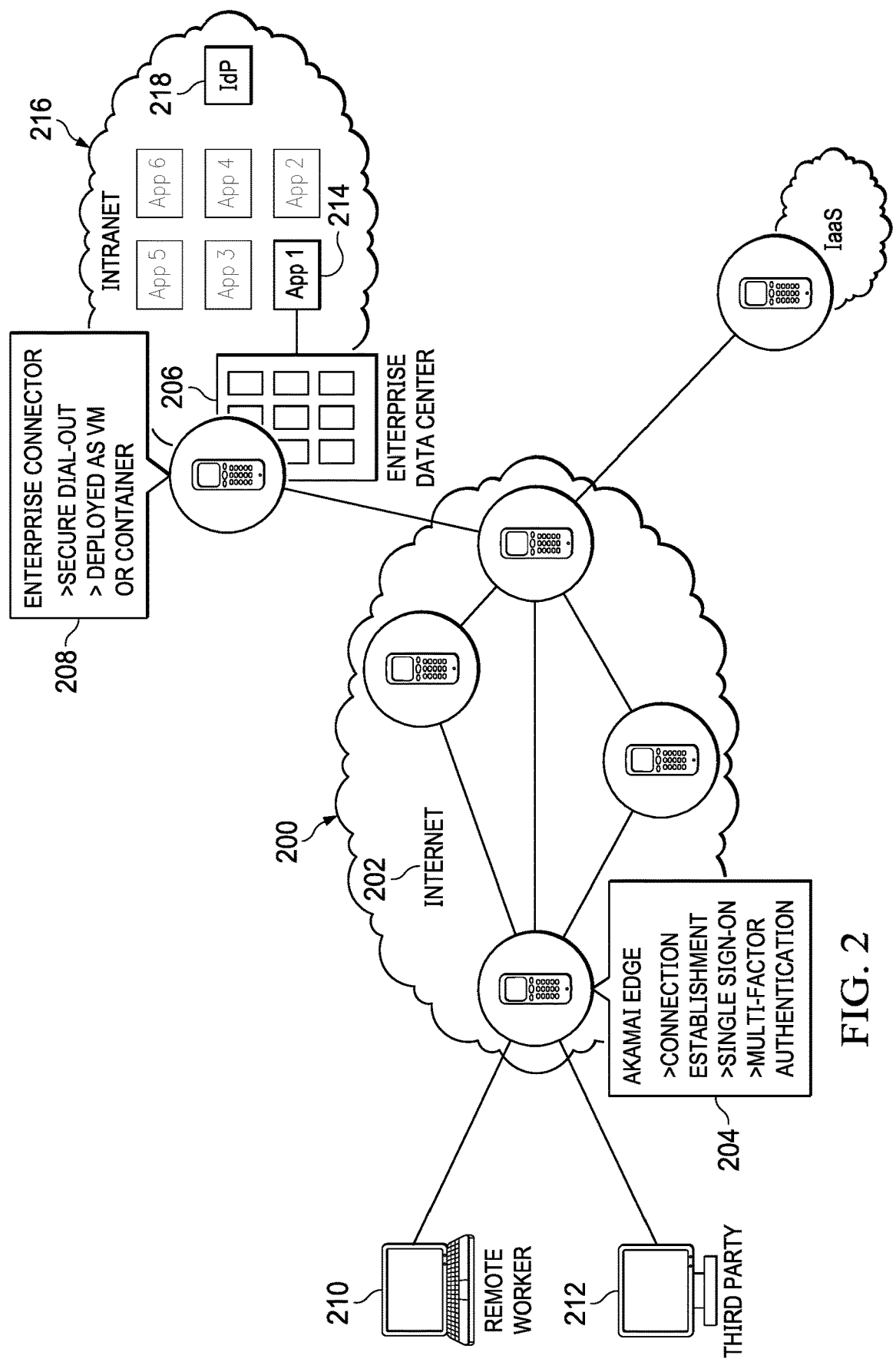
FIG. 2 depicts a technique for providing client-less, application-specific remote access via a service provider in the enterprise network operating environment.
Figure 3:
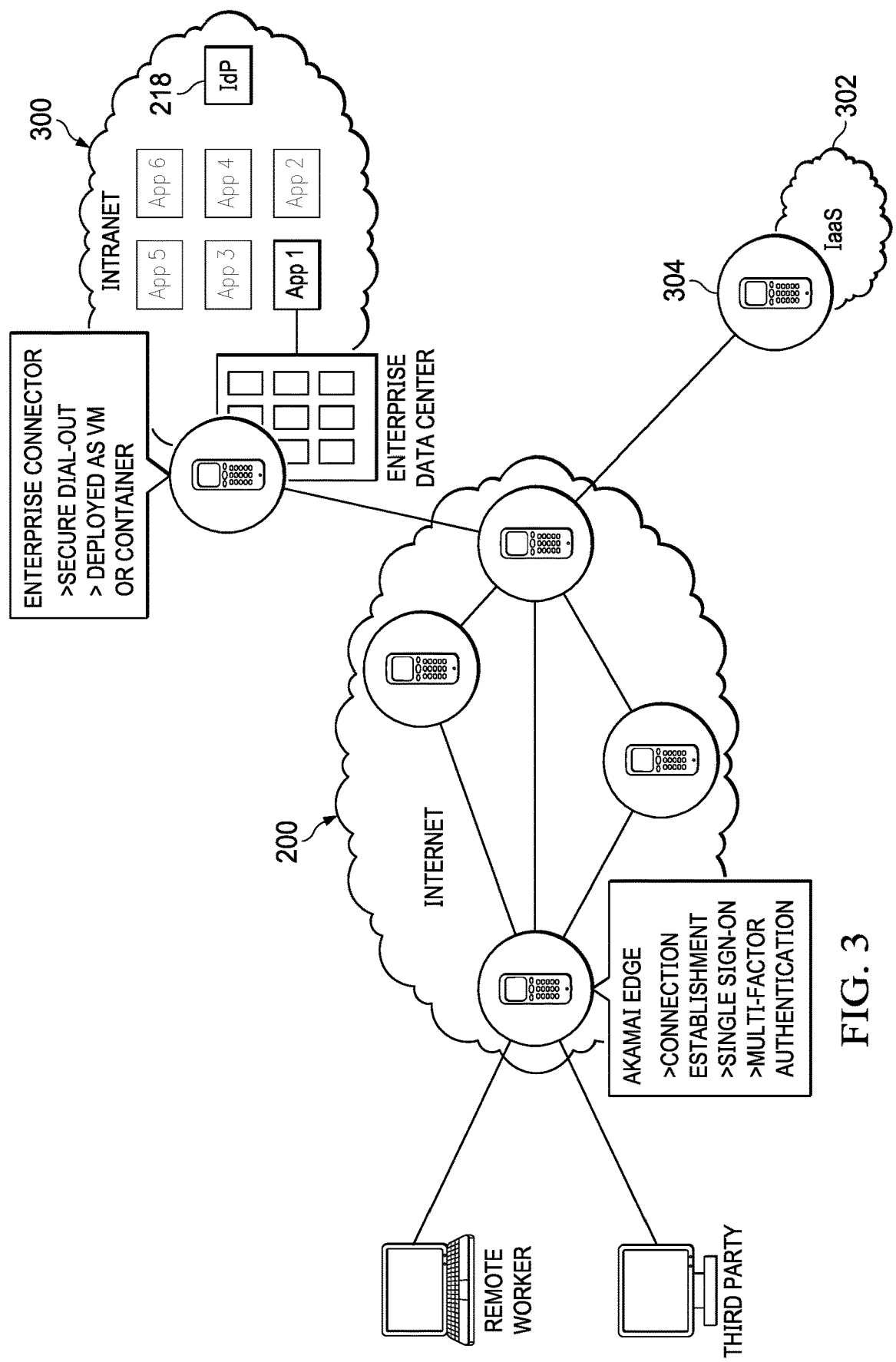
FIG. 3 depicts an operating environment that includes an uncontrolled (by the service provider) network in which a connector appliance is desired to be configured and provisioned according to this disclosure.

This problem has been addressed by the provision of client-less, application-specific remote access via a service provider, such as depicted in FIG. 2. This solution may be provided, for example, as a managed service by a service provider. A representative commercial solution is Soha Cloud, from Akamai Technologies, Inc. of Cambridge, Mass. In this approach, the managed service provider provides an overlay network 200 on the publicly-routed Internet 202. The overlay network comprises edge servers 204, and the enterprise data center 206 supports an enterprise connector 208, which may be deployed in the physical enterprise data center or as a virtual machine (VM) or container in a virtual private cloud (VPC). The enterprise connector 208 provides secure dial-out to the service provider. In this manner, and as depicted, in this approach the third party 210 or remote worker 212 is provided authorized, secure access to specific applications, such as application 214, but to nothing else on the enterprise network 216. In particular, the approach creates an air gap between the private enterprise applications and infrastructure, and the Internet, which thereby minimizes the attack surface and makes the enterprise infrastructure otherwise invisible to the public. Typically, the end user accesses the application with an HTML5 compliant web browser, typically via the service provider edge network.

The enterprise connector 208 integrates with the enterprise's identity store 218. Preferably, the connector 208 mutually authenticates with other elements in the overlay network over TLS. This means that there is no requirement for local enterprise connector management, and preferably there are no inbound open tunnels or ports to the enterprise beyond the standard HTTPS ports that enable the enterprise connector to dial-out to the managed edge network when required. At the same time, the user authenticates (using MFA if required) through the browser over TLS with the managed network and the enterprise's identity store supporting SSO. Once securely-authenticated, the service provider simply stitches together the two TLS sessions over the managed network to provide the user access only to the authorized applications on the enterprise network, but preferably to nothing else. In this manner, the enterprise application 214 hosted behind the firewall in the enterprise data center is now accessible to remote workers and third parties 210 and 212, with SSO and MFA support, through a simple web browser or mobile application, without exposing the entire enterprise network and mitigating unfettered lateral movement among all other applications on the network. Furthermore, preferably all traffic traverses the overlay network to improve the reliability and performance of application access over the Internet.

With the above as background, the technique of this disclosure is now described. In this embodiment, it is assumed that the enterprise 300 (or, more generally, the service consumer or customer) has associated therewith a network 302 that, with respect to the service provider, is uncontrollable. In other words, an uncontrolled network as used herein is one in which the service provider cannot secure or have policies applied, although typically (i.e., in most use cases) the uncontrolled network is controllable by the service provider customer. Thus, for example, the uncontrolled network may be a customer network configured via DHCP, or the uncontrolled network may be defined by a range of static IP addresses over which the customer has sufficient control, directly or indirectly. According to this disclosure, it is desired to support an enterprise connector 304 (or some similar type of functionality) in this uncontrolled network, preferably as an appliance-based solution. An "appliance" in this context typically is a software-based virtual machine (VM), although this is not a limitation, as the notion also may include software executing in physical (generic) hardware. The appliance is part of the service customer's network, however configured, such as shown in FIG. 2.

Figure 4:
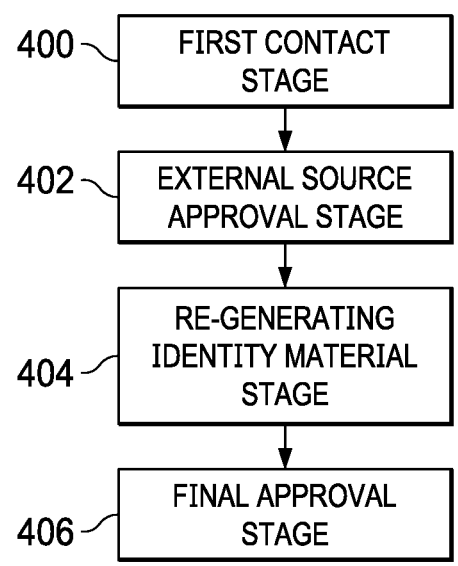
FIG. 4 depicts a process flow for configuring an appliance to interoperate with the cloud-based managed service according to this disclosure.

According to this disclosure, a representative of the enterprise (or some entity that owns or controls the uncontrolled network 302) configures one or more new appliances 304, and such appliances are then self-deployed in the uncontrolled network 302 owned by the service consumer/customer. According to a further aspect of this disclosure, an appliance is required to proceed through a multi-stage approval protocol before it is accepted as a "connector" and is thus enabled for secure communication with the service provider. FIG. 4 is a simplified process flow of these multiple stages. The multiple stages include a "first contact" (back to the service) stage 400, an undergoing approval stage 402, a re-generating identity material stage 404, and a final approved and configured stage 406. Each of these stages is described below. Unless the appliance passes through these stages, the appliance is not permitted to interact with the service as a connector.

The particular details of the managed service itself are described in U.S. Pat. No. 9,491,145, the disclosure of which is incorporated by reference.

Prior to first contact with the service, each appliance is assigned an identity (at a creation time) by following the following operational steps. First, a universally unique identifier (UUID) of a reasonable length is generated and assigned to the appliance. The UUID length may be at least 128 bits, but this is not a limitation. In a variant embodiment, a set of appliances assigned to a given entity may be programmed initially with a UUID that is unique to the entity but that is shared across this set of appliances; in such case and as part of an approval process, each appliance within the set is then allocated its own UUID. Then, a new cryptographic key pair is generated. Preferably, the key pair is an asymmetric key pair comprising a public key, and its associated private key. Using the key pair, a certificate signing request (CSR) is generated and submitted to a Public Key Infrastructure (PKI) trusted by the service. The CSR preferably also contains the appliance's UUID, which thus serves to bind the asymmetric public key to the appliance's UUID in the CSR. In response, a certificate (e.g., an X509 certificate) is received from the service's trusted PKI provider. Preferably, the certificate contains a digital signature from the trusted PKI that confirms the appliance belongs to the service, and the UUID of the appliance. The UUID of the appliance preferably is located in the Common Name of the certificate, which thus serves to give the appliance a unique identity in combination with the cryptographically-unique key pair itself. Thereafter, the returned certificate is embedded in the appliance. To complete the process of creating the initial cryptographic identity, the UUID is added to a list of valid generated appliances for the service consumer/customer that configured the appliance, and that list is provided to the managed service provider. As noted, this service consumer is also the entity that owns or controls the uncontrolled network where the appliance ultimately will reside.

The certificate created in this manner is sometimes referred to herein as the factory certificate for the appliance. As will be seen, the appliance then uses this certificate as a cryptographic credential to authenticate itself to the service when it first connects back to the service. This is the so-called "first contact" stage as noted below. This connection is usually a mutually-authenticated TLS connection, although other forms of secure links may be used. Preferably, this factory certificate is only used by the appliance for authentication when it is in an un-provisioned state and has not yet been configured and approved by the application-specific remote access service.

The following provides a preferred provisioning scenario for an appliance that includes a factory certificate. Preferably, the provisioning process includes several stages, which are now described.

Stage 1

When an appliance is turned on or otherwise powered-up, it checks whether it is in approved and in configured state. If not, preferably the appliance uses its factory certificate to dial home to the remote access service. The service at this point verifies the identity of the appliance, preferably by verifying its factory certificate (issued by the trusted PKI). If the factory certificate is verified, the appliance's UUID is extracted from its certificate. This UUID is then matched against a list of appliances expected to be deployed in the untrusted network—which list has been provided to the service provider by the service consumer (or some other trusted entity, such as the PKI provider). In some embodiments, an untrusted network may consist of a number of disparate untrusted networks, each with their own unique identifiers, such as IP address ranges. The appliance is permitted to connect to the service if and only if a match is found, i.e., the appliance has a valid certificate containing a valid UUID.

Stage 2

Once an un-approved appliance has established a connection back to the service (e.g., creates a session in a management plane executed by the service), in the second stage of the protocol, the appliance undergoes an additional approval process through some external source. In some embodiments, this approval process can be driven manually, or it may be automated or implemented programmatically. In one embodiment, this approval may be based on a configurable acceptance policy, e.g., determined by a representative of the entity that owns the uncontrolled network. Once the approval process is done, a fresh public/private key pair, and a fresh UUID, are generated. A new CSR that is based on the new items is generated and sent to the trusted PKI to obtain a new certificate containing the new UUID. After the trusted PKI responds, the new UUID is added to the list of approved appliance for the service.

Stage 3

Once the appliance has been approved in Stage 2, it generates a new certificate signing request (CSR) and obtains a fresh certificate from the trusted PKI over the pre-existing secure session (usually TLS). At this point, preferably the appliance terminates the secure connection (which was established using the factory certificate), and it establishes a new connection to the service using its newly-issued certificate. Next, the appliance authenticates to the service using its new certificate. The service responds by verifying this certificate, extracting the embedded UUID, and verifying that this UUID appears in the list of approved appliances for the particular service consumer/customer that generated this appliance. An indication to this effect is once again provided to the appliance.

Stage 4

From this point on, the appliance is considered approved and configured (or otherwise "registered" with the enterprise access service), and it is expected to only use this new certificate for establishing all communication with the service. The above-described process ensures that each appliance is explicitly approved and is issued a brand new certificate (whose private key has never left the appliance). Once approved, the appliance preferably is blocked from using its factory certificate, and all connection attempts to the service using its factory certificate are blocked and logged. In this manner, appliances from uncontrolled and untrusted networks can be identified uniquely and authenticated by a service that needs a trusted path to the appliances.

Preventing Against Masquerade-Related Issues

When an appliance contacts the service, preferably a number of checks are performed by the service based on the following factors: state information that the service maintains regarding the appliance (namely, which of the four stages of the approval protocol is the appliance supposed to be in, i.e., first contact, undergoing approval, re-generating identity material, or approved and configured), identity information presented by the appliance (such as UUID and certificate), network information derived from the incoming connection e.g., source IP address and port, historical network data, etc.), and network information maintained by the service provider (e.g., network range(s) to expect incoming appliance traffic).

If an unknown entity attempts to masquerade as a genuine appliance, then the following support is in place to protect against any such unauthorized usage.

A first scenario is when a sanctioned but uncontrolled appliance has not yet undergone the registration process and an unknown entity is able to make a copy of the appliance. In this scenario, the service preferably only permits the entity to connect from the uncontrolled network range(s) belonging to the particular service consumer that generated the appliance using the service. In the scenario where the unknown entity exists within the legitimate network ranges, the service detects one or more appliances presenting the same UUID and certificate from within the service consumer's uncontrolled network range. At this point, the service blocks appliances with the same UUID from proceeding further in the approval protocol. The service also preferably alerts the representative of the service consumer. At this point, the service consumer can take a corrective action, such as manually approving the unknown entity as a valid duplicate, or blocking all instances of appliances with the same UUID from connecting to the service. This corrective process may be manually-driven, or automated. In another embodiment, this approval may be based on a configurable acceptance policy (e.g., as determined by a representative of the entity that owns the uncontrolled network). In case of valid duplicates, the appliance with the same UUID may be permitted to proceed to further stages, and the appliances marked duplicates preferably generate a new UUID and obtain a new certificate based on this UUID from the trusted PKI via the service and then re-enter Stage 1. The UUIDs of the appliances marked duplicate are added to the list of valid generated appliances for the service consumer concerned so that these appliances can proceed to Stage 1.

A second scenario is when a sanctioned, uncontrolled appliance has already undergone the registration process and an unknown entity was able to make a perfect copy of the appliance prior to the registration process. In this scenario, the action taken by the service is similar to that in the prior scenario. In particular, the service preferably blocks any incoming connections from unapproved network range(s). It detects the unknown entity when it connects from within the service consumer's uncontrolled network range and presents the same UUID as the approved appliance. At this point, the service blocks the unknown entity from proceeding further in the approval protocol without any negative impact on the registered appliance. The service also alerts the representative of the service consumer at which point, they can take one of the several corrective actions: either manually approve the unknown entity as a valid duplicate, terminate the network connection from the unknown entity and report its source IP address to the service consumer, or block all instances of appliances with the UUID from connection to the service and terminate the existing appliance. In some embodiment, this correction action process can be driven manually, or it may be automated or under programmatic control. In other embodiments, this approval may be based on a configurable acceptance policy (as determined by a representative of the entity that owns the uncontrolled network). In case of valid duplicates, the appliances marked duplicates generate a new UUID and obtain a new certificate based on this UUID from the trusted PKI via the service and re-enter Stage 1. The UUIDs of the appliances marked duplicate are added to the list of valid generated appliances for the service consumer concerned so that these appliances can proceed to Stage 1.

In yet another scenario, a sanctioned, uncontrolled appliance has already undergone the registration process and an unknown entity makes a perfect copy of the appliance after the registration process. Once again, the action taken by the service in this scenario is similar to that in the second scenario above. In particular, the service blocks any incoming connections from unapproved network range(s). It detects unknown entity when it connects from within the service consumer's uncontrolled network range and presents the same UUID as the approved appliance. At this point, the service blocks the unknown entity from passing any traffic through the service without any negative impact on the registered appliance. The service also alerts the representative of the service consumer at which point, they can take one of the several corrective actions: either manually approve the unknown entity as a valid duplicate, terminate the network connection from the unknown entity and report its source IP address to the service consumer, or block all instances of appliances with the UUID from connection to the service and terminate the existing appliance. In some embodiment, this correction action process can be driven manually, or it may be automated or under programmatic control. In other embodiments, this approval may be based on a configurable acceptance policy (as determined by a representative of the entity that owns the uncontrolled network). In case of valid duplicates, the appliances marked duplicates generate a new UUID and obtain a new certificate based on this UUID from the trusted PKI via the service and re-enter Stage 1. The UUIDs of the appliances marked duplicate are added to the list of valid generated appliances for the service consumer concerned so that these appliances can proceed to Stage 1.

Figure 5:
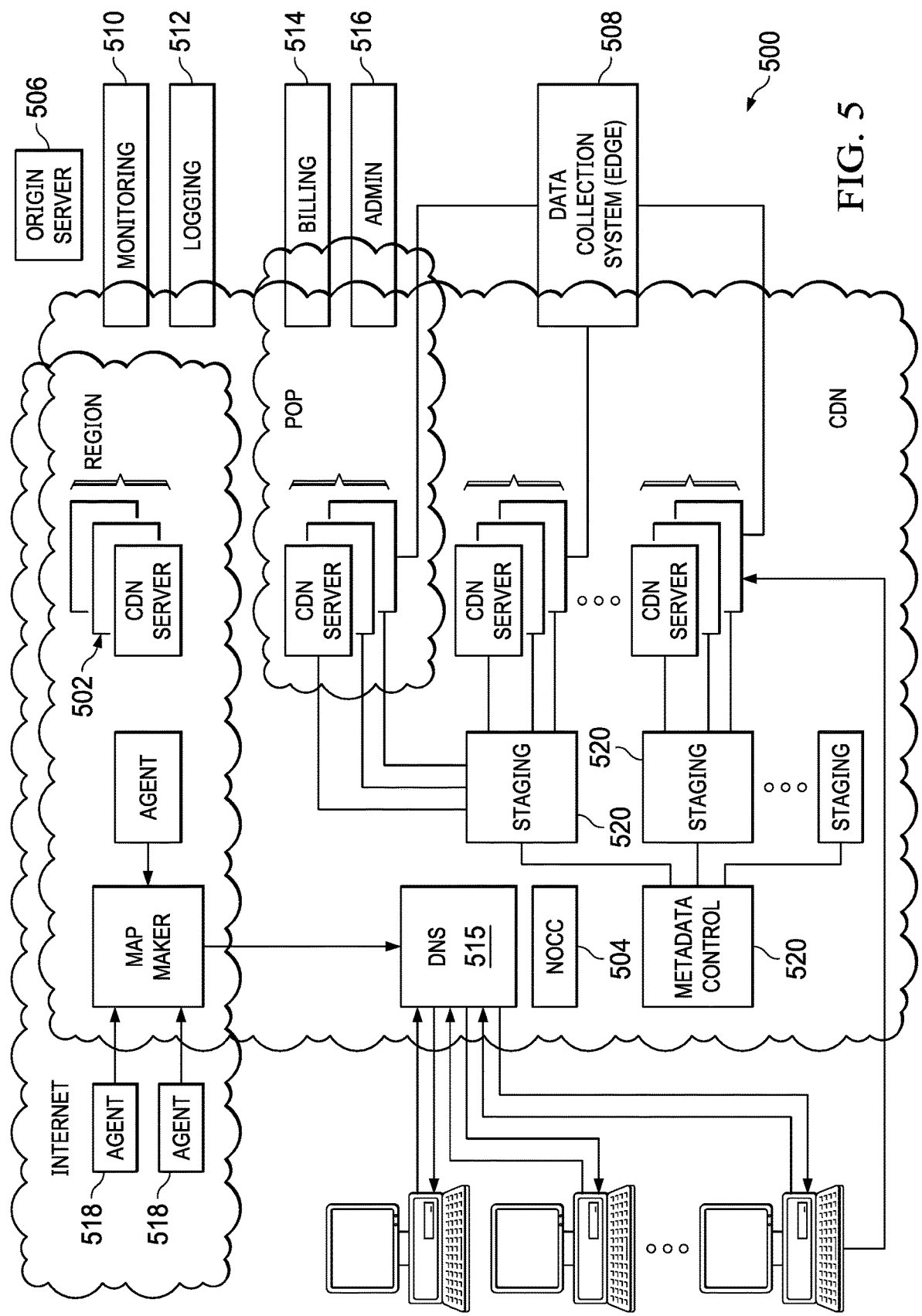
FIG. 5 depicts an overlay network (e.g., a CDN) in which aspects of this disclosure may be implemented in one non-limiting embodiment.

The managed service may be provided in association with a service provider such as a content delivery network (CDN). This is not a limitation, however, as the technique herein may be used with any cloud-based service. A known approach of this type, such as provided by Akamai Technologies, Inc. of Cambridge, Mass., is shown in FIG. 5. As depicted, a distributed computer system 500 is configured as a CDN and is assumed to have a set of machines 502 distributed around the Internet. Typically, most of the machines are servers located near the edge of the Internet, i.e., at or adjacent end user access networks. A network operations command center (NOCC) 504 manages operations of the various machines in the system. Third party sites, such as web site 506, offload delivery of content (e.g., HTML, embedded page objects, media, software downloads, and the like) to the distributed computer system 500 and, in particular, to "edge" servers 502. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. The distributed computer system may also include other infrastructure, such as a distributed data collection system 508 that collects usage and other data from the edge servers, aggregates that data across a region or set of regions, and passes that data to other back-end systems 510, 512, 514 and 516 to facilitate monitoring, logging, alerts, billing, management and other operational and administrative functions. Distributed network agents 518 monitor the network as well as the server loads and provide network, traffic and load data to a DNS query handling mechanism 515, which is authoritative for content domains being managed by the CDN. A distributed data transport mechanism 520 may be used to distribute control information (e.g., metadata to manage content, to facilitate load balancing, and the like) to the edge servers 502.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide various technologies and techniques to accelerate traffic flow between an edge server, on the one hand, and a customer origin server, on the other. These technologies provide acceleration for many different types of interactions, e.g., delivery of dynamic content, edge server interactions with back-end origin infrastructures, and the like. Representative examples include, without limitation, the techniques described in U.S. Pat. No. 8,194,438 (overlay path selection optimization), and U.S. Pat. No. 8,477,837 (content pre-fetching). Other IP, TCP, UDP or application-layer optimizations may be implemented as well to facilitate such acceleration. These techniques are sometimes referred to herein as "overlay network optimizations."

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. The functionality may be built into server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with any application layer protocols, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

The platform functionality may be co-located or various parts/components may be separately and run as distinct functions, in one or more locations (over a distributed network).

Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). A cloud platform may comprise co-located hardware and software resources, or resources that are physically, logically, virtually and/or geographically distinct. Communication networks used to communicate to and from the platform services may be packet-based, non-packet based, and secure or non-secure, or some combination thereof. A representative cloud platform comprises host machines (e.g., servers or like physical machine computing devices) connected to a physical datacenter network, typically via a hypervisor management VLAN. The environment typically also includes load balancers, network data switches (e.g., top-of-rack switches), firewalls, and the like. Physical servers in the environment are each adapted to dynamically provide one or more virtual machines (VMs) using virtualization technology, such as VMWare. Multiple VMs can be placed into a single host machine and share the host machine's CPU, memory and other resources. Typically, a cloud is maintained by a "cloud operator" or "operator."

Having described our invention, what is claimed is set forth as follows.

The invention claimed is:

1. A method of deploying an appliance in an untrusted network to interoperate with a cloud-based managed service providing secure enterprise access, wherein the appliance has an assigned initial cryptographic identity, comprising the ordered steps:
   with the appliance positioned within the untrusted network and in an un-provisioned and un-approved state, receiving, by the cloud-based managed service, a certificate issued by a trusted Public Key Infrastructure (PKI) that includes a cryptographic identity having a digital signature from the PKI that confirms that the appliance is permitted to access the managed service;
   upon verifying, by the cloud-based managed service, that the cryptographic identity is associated with a list of one or more appliances that are expected to be deployed in the untrusted network, returning to the appliance an indication that the appliance is approved to connect to the managed service;
   with the appliance in an approved state, receiving, by the cloud-based managed service, a new certificate issued by the PKI that includes a new cryptographic identity;
   upon verifying, by the cloud-based managed service, that the new cryptographic identity is associated with the list of one or more appliances that are expected to be deployed in the untrusted network, providing to the appliance an indication that the appliance is configured to use the managed service;
   wherein following configuration of the appliance to use the managed service, blocking access to the managed service from the appliance except via the new certificate.

2. The method as described in claim 1 wherein the new cryptographic identity is obtained by the appliance after receipt of the indication and following execution at the appliance of an additional approval protocol.

3. The method as described in claim 2 wherein the additional approval protocol is carried out either manually or in an automated or programmatic manner.

4. The method as described in claim 1 wherein the cryptographic identity is a first universally unique identifier (UUID), and wherein the new cryptographic identify is a second UUID that differs from the first UUID.

5. The method as described in claim 4 wherein the cryptographic identity is generated by the PKI by binding the first UUID to a public key, the public key having an associated private key.

6. The method as described in claim 1 wherein the certificate is received from the appliance over a first cryptographically-secure communication link.

7. The method as described in claim 6 wherein the new certificate is received from the appliance over a second cryptographically-secure communication link that differs from the first cryptographically-secure communication link.

8. The method as described in claim 1 further including maintaining information about the appliance.

9. The method as described in claim 8 further including managing connectivity of the appliance to the managed service using the information.

10. The method as described in claim 8 wherein the information includes state information that defines one of: a provisioning state of the appliance, identity information identifying the appliance, and network information associated with the uncontrolled network.

11. The method as described in claim 1 further including:
    detecting whether an entity attempting to access the managed service with a third certificate that includes a universally unique identifier (UUID) is an approved appliance; and
    taking a given action with respect to the entity attempting to access the managed service with the third certificate.

12. The method as described in claim 11 wherein the given action is one of: approving the entity as a duplicate of the appliance, terminating a connection associated with the entity, and blocking all instances of any entity that presents the UUID.

13. The method as described in claim 1 wherein the managed service is associated with a content delivery network (CDN).

14. The method as described in claim 1 wherein the appliance is a virtual machine (VM).

15. The method as described in claim 1 wherein the new cryptographic identity has an associated private key that is only available locally to the appliance.

16. The method as described in claim 1 further including establishing a mutually-authenticated TLS connection to the appliance from the managed service.

17. The method as described in claim 1 wherein the PKI is associated with the managed service.

18. The method as described in claim 1 further including restricting access to the managed service by the appliance presenting the new certificate except through a predetermined Internet Protocol (IP) address range.

* * * * *